Feb. 13, 1962     G. C. BODINE     3,021,168
WORKPIECE GRASPING APPARATUS
Filed March 28, 1960

GEORGE C. BODINE
INVENTOR,
HUEBNER & WORREL
ATTORNEYS
BY
Richard M. Worrel

United States Patent Office 3,021,168
Patented Feb. 13, 1962

3,021,168
WORKPIECE GRASPING APPARATUS
George C. Bodine, 31029 Road 160, Visalia, Calif.
Filed Mar. 28, 1960, Ser. No. 17,830
11 Claims. (Cl. 294—88)

The present invention relates to a workpiece grasping apparatus and, more particularly, to a hook for releasably, firmly grasping a workpiece, such as a limb of tree, pipe, log, pole, tire, and the like, with a minimum of damage thereto incident to the grasping for shaking, elevationally adjusting, or otherwise handling the workpiece in a dependable manner.

The principles of the present invention are conveniently described by referring to tree shaking machines employed in the harvesting of certain fruits, nuts, and the like. Briefly, these machines usually include a mobile frame, an elongated boom mounted on the frame for elevational adjustment, means on the extended end of the boom for engaging or grasping the limb of a tree, and means on the frame engaging the boom for imparting a reciprocal or jarring movement thereto whereby the tree is shaken and the fruit or nuts fall to the ground.

It has been known in the past to use cables, saddles, and hooks as the means on the boom for engaging or clamping the limb of the tree. While it is further desirable firmly to grasp the limb substantially circumferentially thereof, the known hooks intended for this purpose are subject to several disadvantages believed to be avoided by the subject invention. Generally, the prior art hooks have either failed to grasp the limb tightly enough whereby the hooks rub against the tree and cause damage thereto during the shaking action, or such known hooks which are capable of effecting a tighter grip have been unable to grasp the limb initially so as to avoid scraping or otherwise damaging the bark.

While the hook of the subject invention is described and is excellently suited for use with tree shaking machines, it has wider utility in engaging and holding various workpieces which will be readily understood and the invention is not to be limited to use with any particular workpiece.

It is an object of the present invention to provide a workpiece grasping apparatus for releasably, tightly grasping a workpiece in an improved manner.

Another object is to provide a hook for grasping a workpiece so that the workpiece is held against movement relative to the hook.

Another object is to enable a workpiece to be grasped within a hook without scraping, cutting, abrading, or otherwise damaging the workpiece or with a minimum of damage thereto.

Another object is to provide a workpiece grasping apparatus adapted to engage the workpiece in a predetermined angular relation and to receive the workpiece in fitted relation in the apparatus.

Another object is to provide a workpiece grasping head in an apparatus of the character described mounted for universal movement.

Another object is to provide an apparatus of the type described which is capable of handling a variety of workpieces.

Other objects are to provide a workpiece grasping apparatus which is relatively simple and economical to build and use, durable in construction, dependable in action, and excellently suited for accomplishing its intended purposes.

These, together with other objects, will become more fully apparent upon reference to the following description and accompanying drawing.

Figure 1:
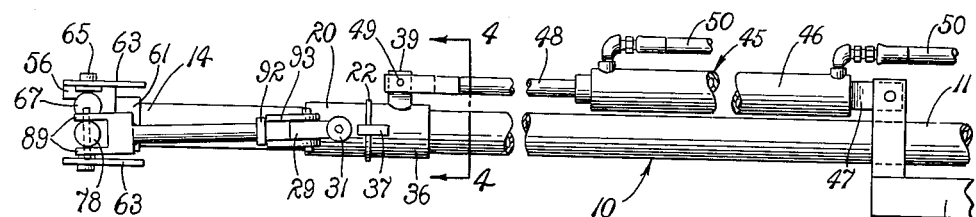
FIG. 1 is a longitudinal side view of a workpiece grasping apparatus embodying the principles of the present invention and showing jaws thereof in workpiece engaging positions.

Referring more particularly to the drawing, an elongated, cylindrical boom 10 provides a rear mounted end 11 journaled in a support, generally indicated by the numeral 12, for rotation of the boom about its longitudinal axis, and an oppositely extended front end 14 providing an elongated, longitudinally extended keyway 16. The support may be a mobile frame or other vehicle constituting a part of a tree shaking machine. Insofar as the present invention is concerned, however, no further description of the support is believed necessary.

A driven collar 20 is longitudinally slidably fitted on the boom 10 and includes a radially inwardly extended key 21 longitudinally slidably fitted in the keyway 16 thereby precluding rotation of the collar relative to the boom and restricting longitudinal movement of the collar on the boom to the length of the keyway. The collar also has a circumferential rim 22 disposed toward the mounted end 11 of the boom. Studs 24 are coaxially outwardly oppositely extended from the collar, and inner disks 26 are rigidly transversely connected to the studs between the collar and the outer ends of the studs. Swivel sleeves 28 are rotatably borne by the studs outwardly of the inner disks and include radially extended flanges 29. Outer disks 31 are positioned outwardly against the ends of the studs and sleeves, and bolts 32 connect the outer disks to their respective studs. In this manner, the sleeves are precluded from moving axially on the studs but are free to swivel between the disks around the common axis of the studs, this axis being perpendicular to the boom 10.

A driving collar 36 is also axially slidably fitted on the boom 10 on the side thereof toward the mounted end 11. Coupling bars 37 are rigidly connected to the driving collar on opposite sides thereof and extend axially of the boom in overlapping relation to the driven collar 20. The bars have slots 38 rotatably receiving the rim 22 of the driven collar so that the collars are interconnected for unitary sliding movement along the boom but for rotatable movement relative to each other. More specifically, the driving collar rotates on the boom relative to the driven collar. An ear 39 is rigidly radially outwardly extended from the driving collar for a purpose to be described.

An hydraulic ram 45 includes a cylinder 46 having a mounted end 47 pivotally connected to the support 12 and a reciprocal piston rod 48 pivotally connected to the ear 39 by means of a pin 49. The ram extends longitudinally along the boom 10. It will be evident that the boom is rotatable about its longitudinal axis without rotating the ram. The ram has inlet and outlet hoses 50 for feeding and bleeding fluid to and from the ram slidably to position the collars 20 and 36 along the boom.

Figure 3:
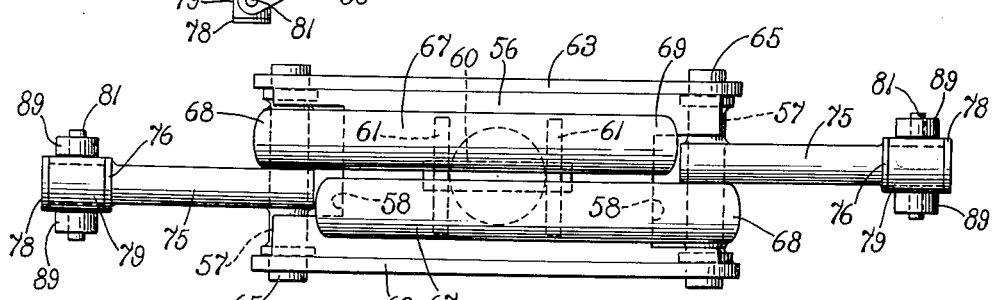
FIG. 3 is a somewhat enlarged end view of the apparatus as illustrated in FIGS. 1 and 2 with the jaws in workpiece engaging positions.
Figure 4:
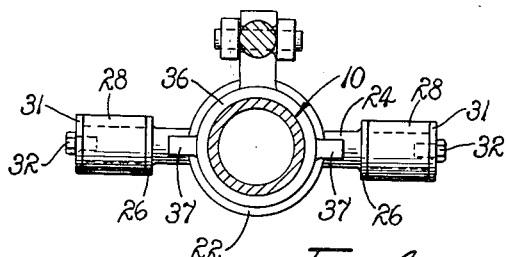
FIG. 4 is a somewhat enlarged, transverse section taken on line 4—4 of FIG. 1.

A mounting head, generally indicated by the numeral 55, includes an elongated, concavo-convex, and therefore arcuate, workpiece engaging plate 56 having opposite end edges 57 in which are provided notches 58 in partially transversely offset relation to each other, as best illustrated in FIG. 3. A head mounting pin 60 is transversely borne by the extended end 14 of the boom and is disposed in longitudinally spaced, parallel relation to the common axis of the studs 24. Webs 61 are rearwardly outwardly extended from the convex surface of the plate 56 in spaced relation longitudinally thereof and are pivotally supported on opposite ends of the pin which extend outwardly from the boom. The webs are thus also disposed on opposite sides of the boom. The mounting head also includes a pair of side flanges 63 rearwardly extended from the plate away from the concave surface thereof and on opposite sides of the boom. The head is thus mounted on the boom for pivotal movement relative thereto about an axis extended perpendicularly of the boom. However, this pivotal movement is limited in opposite directions by engagement of the flanges with opposite sides of the boom, as is believed readily evident by reference to FIG. 1.

Figure 2:
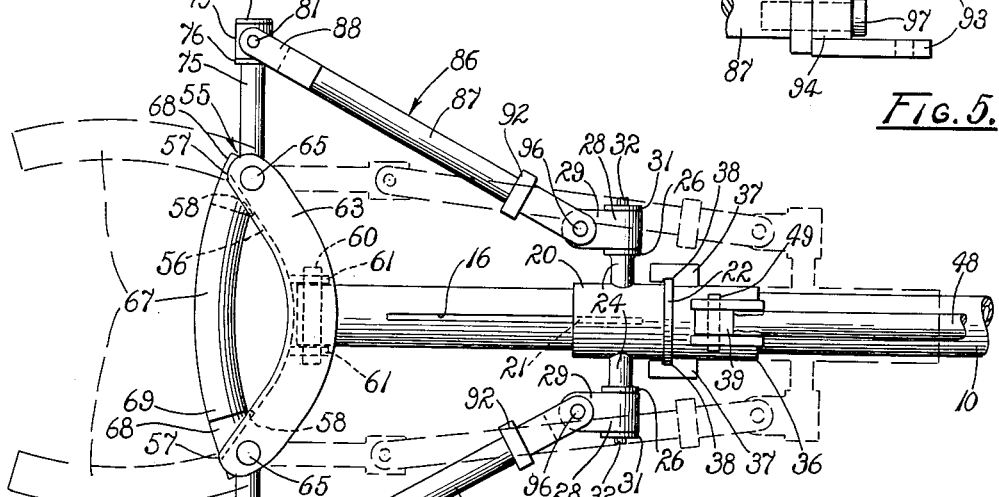
FIG. 2 is a somewhat enlarged, fragmentary longitudinal side view taken from a position displaced ninety degrees from the viewing position of FIG. 1 and showing the jaws and associated mechanism in workpiece engaging positions in solid lines and in retracted positions in dashed lines.

Elongated shafts 65 extend between and are mounted in the side flanges 63 adjacent to the opposite ends of the workpiece engaging plate 56 and individually back of the notches 58. These shafts are parallel to each other and extend transversely of the plate as well as the boom 10. A further relationship is that the shafts are substantially perpendicular to the head mounting pin 60, as will be understood by reference to FIG. 2. A pair of elongated, arcuate jaws 67 have mounted ends 68 individually rigidly connected to the shafts in transversely offset relation with respect to the plate 56 and are extended from their shafts through their respectively adjacent notches 58. The jaws also have opposite extended ends 69. Each of the jaws is preferably substantially cylindrical, and slightly shorter and of slightly less curvature than the plate 56. The jaws are thus mounted for pivotal movement between workpiece engaging or closed positions in overlying relation to the concave surface of the plate and in side-by-side relation to each other, as illustrated in solid lines in FIGS. 2 and 3, and retracted or open positions endwardly outwardly extended from opposite ends of the plate and constituting substantially continuous, smooth extensions of the plate, as illustrated in dashed lines in FIG. 2. Since the jaws are also concavo-convex, it is to be noted that the jaws are mounted on the shafts so that the concave surfaces of the jaws and the plate are in opposed relation to each other when the jaws are in workpiece engaging positions.

Levers 75 are individually rigidly connected to the shafts 65 adjacent to and oppositely outwardly extended from their respective jaws 67. It is to be noted that the levers are substantially parallel to the studs 24. Inner and outer disks 76 and 78 are rigidly mounted in axially spaced relation on each of the levers. Swivel sleeves 79 are rotatably mounted on the levers between the disks, and pegs 81 are diametrically oppositely outwardly extended from each sleeve 79.

Figure 5:
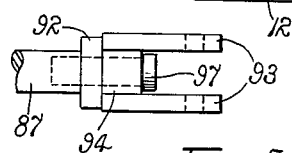
FIG. 5 is a somewhat enlarged, fragmentary side view of a portion of a link employed in the subject apparatus.

Telescopically adjustable links 86 interconnect the sleeves 79 of the levers 75 and the flanges 29 of the sleeves 28 on the studs 24. Each link includes an elongated rod 87 having a yoke 88 thereon including a pair of spaced arms 89 pivotally connected to the sleeves 79 by means of the pegs 81. The ends of the rods 87 opposite to the yokes 88 have jamb nuts 92 engaged thereagainst. As best shown in FIG. 5, a pair of spaced arms 93 are interconnected by a sleeve 94 to form an additional yoke. The arms are so spaced by the sleeve 94 that they fit above and below the flanges 29, as shown in FIG. 1, to which they are pivotally connected by means of pins 96 extended through the arms and their respective flanges. A bolt 97 is extended through the sleeve 94, screw-threadably engaged with the jamb nut 92 and screw-threadably connected to the rod 87, in substantial alignment therewith. Each rod is so equipped. When the jamb nuts are loosened, the bolts may be screwed in or out of their respective rods effectively to lengthen or to shorten their respective links 86. When properly adjusted, the jamb nuts are tightened against their respective rods and thus secure the bolts in position. Inasmuch as the sleeves 94 were free to rotate on the bolts 97, it will be evident that the arms 89 and the arms 93 can rotate or swivel with respect to each other. Thus, it will be evident that the links provide longitudinally adjustable interconnection between the levers 75 and to the flanges 29 pivotal about the pegs 81 and pins 96.

*Operation*

The operation of the described embodiment of the subject invention is believed to be readily apparent and is briefly summarized at this point. Assuming that the subject apparatus is used in a tree shaking machine, not shown in its entirety, the boom 10 is elevated and extended so that the mounting head 55 is adjacent to a limb, not shown, to be grasped. The ram 45 is retracted to slide the collars 20 and 36 away from the mounting head. This pulls the levers 75 rearwardly to rock the shafts 65 and move the jaws 67 into their open or retracted positions, illustrated in dashed lines in FIG. 2. The boom is again moved axially forwardly to place the jaws about the limb and into engagement with the concave surface of the plate 56.

Inasmuch as it is desirable to orient the workpiece engaging plate 56 with respect to the limb so that the limb is substantially perpendicular to the plate and the plate is disposed to fit flush or substantially complementarily against the limb, it may be necessary to make other adjustments in the subject apparatus. In order to bring the plate into such an oriented relation to the limb, the boom 10 is rotated relative to the support 12. Because the mounting head 55 is pivotally connected to the boom, forward movement of the boom automatically pivots the head with respect to the boom, when the plate is in engagement with the limb, so as to urge the concave surface of the plate flat or flush against the limb. It is to be observed that as the head pivots with respect to the boom, the levers 75 rotate or swivel within the sleeves 79. Also, the sleeves 28 rotate about the studs 24 depending on the direction of pivoting or tilting of the head with respect to the boom.

When the concave surface of the plate 56 is in the described engagement with such a tree limb, the ram 45 is extended thereby to pivot the jaws 67 into their closed, workpiece engaging positions in engagement with the limb on the opposite side thereof from the plate. The jaws thus extend around the limb and engage the same at longitudinally spaced positions therealong. With pressure continuously exerted by the ram, it is evident that the limb is firmly grasped between the jaws and the plate. The limb is released by retracting the ram to move the jaws into open position.

From the foregoing, it will be evident that a workpiece grasping apparatus has been provided which offers certain advantages. The plate 56 and jaws 67 grasp workpieces releasably and yet very firmly therebetween. It is to be noted in this regard that the levers 75 and the connection of the links 86 thereto outwardly of the shafts 65 impart an advantageous mechanical advantage to the ram as it urges the jaws into their grasping positions. Damage to workpieces engaged by the subject apparatus is minimized because of the universal movement of the head 55 to bring the plate into the proper orientation with respect to the workpiece prior to and during grasping thereof.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. In a workpiece grasping apparatus, an elongated, substantially rigid mounting member having a predetermined longitudinal axis; an elongated workpiece engaging plate having opposite ends; means connected to the plate intermediate its ends and fastening the plate to the mounting member, the plate having a longitudinal dimension extended outwardly in opposite directions from the mounting member and transversely of said axis; elongated jaws individually mounted on opposite ends of the plate for pivotal movement about an axis disposed transversely of the longitudinal dimension of the plate and said axis of the mounting member, the jaws being pivotal between a workpiece engaging position in opposed overlying relation to the plate and a retracted position outwardly extended from the plate; a slide longitudinally slidably fitted on the mounting member; means interconnecting the jaws and the slide for moving the jaws between their engaging and retracted positions incident to movement of the slide on the mounting member; and powered means connected to the slide for moving the slide along the mounting member.

2. The apparatus of claim 1 wherein said fastening means pivotally interconnects the plate and said member for pivotal movement of the plate about an axis disposed transversely of said axis of the mounting member and of the pivot axes of the jaws.

3. In a workpiece engaging hook, an elongated mounting member; an elongated arcuate workpiece engaging plate connected to the mounting member and extended transversely outwardly in opposite directions therefrom, the plate having a longitudinal dimension extended transversely of the mounting member; a pair of elongated arcuate jaws individually pivotally connected to the plate on opposite sides of the mounting member and in transversely offset relation to each other for movement about substantially parallel axes extended transversely of the mounting member and the plate between side-by-side workpiece engaging positions overlapping the plate and retracted positions endwardly outwardly extended from the plate; a slide member longitudinally slidably borne by the mounting member for movement toward and away from the plate; a pair of elongated rigid links having opposite ends; means individually pivotally connecting the ends of the links to the slide member and to the jaws for relative pivotal movement therebetween around axes parallel to the pivot axes of the jaws whereby the jaws are moved between their engaging and retracted positions incident to movement of the slide member on the mounting member and powered means connected to the slide for moving the slide along the mounting member.

4. The hook of claim 3 wherein the plate is connected to the mounting member for pivotal movement about an axis extended transversely of the mounting member and longitudinally of the plate; and wherein said means provides for swiveling movement of the jaws relative to the links, and of the links relative to the slide, about axes substantially parallel to the axis of pivotal movement of the plate relative to the mounting member.

5. A workpiece grasping apparatus comprising a support; an elongated boom having opposite mounted and extended ends and a longitudinal axis, the mounted end of the boom being journaled in the support for rotation of the boom about its longitudinal axis; a driven collar non-rotatably, longitudinally slidably fitted on the extended end of the boom having studs coaxially extended oppositely outwardly therefrom substantially normally of the boom; a drive collar rotatably, longitudinally slidably fitted on the boom between the driven collar and the mounted end of the boom; means on the collars for coupling the drive collar to the driven collar for rotation of the drive collar on the boom relative to the driven collar; a mounting head including an elongated, longitudinally arcuate workpiece engaging plate having a concave surface, opposite end edges individually providing notches, and side flanges extended from the plate away from the concave surface thereof; means connecting the plate between its ends to the extended end of the boom with the concave surface of the plate disposed away from the boom and with the boom being positioned between said side flanges for pivotal movement of the head about an axis substantially parallel to the studs, said pivotal movement of the head being limited in opposite directions by engagement of the flanges with the boom; substantially parallel pivot shafts individually extended between the side flanges transversely of the plate and adjacent to said notches disposed substantially normally to the boom and to the pivot axis of the plate; elongated arcuate jaws individually rigidly connected to the shafts and extended through the notches adjacent to their respective shafts for movement between workpiece engaging positions in side-by-side opposed, overlapping relation to the plate, and retracted positions individually endwardly extended from the opposite ends of the plate and constituting endward extensions of the plate; levers individually rigidly connected to the shafts and extended therefrom in the opposite directions from their respectively associated jaws; sleeves individually non-slidably mounted on the levers and the studs for rotation about axes extended longitudinally of their respective levers and studs; elongated links individually pivotally interconnecting the sleeves on corresponding sides of the the boom for relative pivotal movement between the levers, the links, and the studs about axes substantially parallel to the shafts; and powered reciprocal means borne by the support and pivotally connected to the drive collar for sliding the collars longitudinally on the boom thereby to move the jaws between their workpiece engaging and retracted positions.

6. In a workpiece handling apparatus, an elongated mounting member having a predetermined longitudinal axis; an elongated workpiece engaging plate connected to the mounting member and having a longitudinal dimension extended transversely of said axis of the mounting member, the plate having end portions extended outwardly in opposite directions from the mounting member; elongated jaws individually mounted on the end portions of the plate on opposite sides of the mounting member for pivotal movement about axes disposed transversely of the longitudinal dimension of the plate and of said axis of the mounting member, the jaws being pivotal between a workpiece engaging position in opposed overlying relation to the plate and a retracted position outwardly extended from the plate; a slide longitudinally slidably fitted on the mounting member; means interconnecting the jaws and the slide for moving the jaws between their engaging and retracted positions incident to movement of the slide on the mounting member; and powered means connected to the slide for moving the slide relative to the mounting member.

7. In a workpiece handling apparatus, an elongated mounting member having a predetermined longitudinal axis; an elongated workpiece engaging plate connected to the mounting member and having a longitudinal dimension extended transversely of said axis of the mounting member; elongated jaws individually mounted on the plate on opposite sides of the mounting member for pivotal movement about axes disposed transversely of the longitudinal dimension of the plate and of said axis of the mounting member, the jaws being pivotal between a workpiece engaging position in opposed overlying relation to the plate and a retracted position outwardly extended from the plate; means borne by the mounting member for longitudinal slidable movement therealong; means individually interconnecting the jaws and said slidable means for moving the jaws between their engaging and retracted positions incident to longitudinal movement of said slidable means on the mounting member; and powered means connected to the slidable means for moving said slidable means along the mounting member.

8. A workpiece grasping apparatus comprising an elongated boom having an extended end and a longitudinal axis; collar means longitudinally slidably fitted on the extended end of the boom having studs coaxially extended oppositely outwardly therefrom substantially normally of the boom; an elongated, longitudinally arcuate workpiece engaging plate having a concave surface and opposite end edges; means connecting the plate between its ends to the extended end of the boom with the concave surface of the plate facing away from the boom; substantially parallel pivot shafts individually mounted in, and extended transversely of, the plate adjacent to said end edges thereof, said shafts being disposed substantially normally to the boom; elongated arcuate jaws individually rigidly connected to the shafts for movement between workpiece engaging positions in side-by-side opposed, overlapping relation to the plate, and retracted positions individually endwardly extended from opposite end portions of the plate and constituting endward extensions of the plate; levers individually rigidly connected to the shafts and extended therefrom in opposite directions from their respectively associated jaws; elongated links having opposite ends; means individually pivotally interconnecting opposite ends of the links to the levers and the studs on corresponding sides of the boom for relative pivotal movement between the levers, the links, and the studs about axes substantially parallel to the shafts; and powered reciprocal means connected to the collar means for sliding the collar means longitudinally on the boom thereby to move the jaws between their workpiece engaging and retracted positions.

9. The apparatus of claim 8 wherein the boom has an elongated keyway; and wherein a key is extended inwardly from the collar means and slidably fitted in the keyway for precluding rotation, but allowing longitudinal slidable movement, of the collar means on the boom.

10. The apparatus of claim 8 wherein said plate connecting means pivotally connects the plate on the boom for rocking movement about an axis substantially normal to the boom and to the shafts; wherein sleeves are individually non-slidably mounted on the levers and the studs for rotation about axes extended longitudinally of their respective levers and studs and substantially normal to the shafts; and wherein said link interconnecting means pivotally connects the links to their corresponding sleeves for rotation about said axes substantially parallel to the shafts whereby the sleeves accommodate said rocking movement of the workpiece engaging plate.

11. In a workpiece grasping apparatus, an elongated, substantially rigid mounting member having a predetermined longitudinal axis; an elongated workpiece engaging plate having opposite ends; means connected to the plate intermediate its ends and fastening the plate to the mounting member, the plate having a longitudinal dimension extended transversely of the axis of said mounting member; an elongated jaw pivotally mounted on the plate in transversely offset relation to the axis of the mounting member for pivotal movement between a workpiece engaging position in opposed overlying relation to the plate and a retracted position outwardly extended from the plate; a slide longitudinally slidably borne by the mounting member; means interconnecting the jaw and the slide for movement of the jaw between its engaging and retracted positions incident to movement of the slide on the mounting member; and powered means connected to the slide for moving the slide along the mounting member.

References Cited in the file of this patent
UNITED STATES PATENTS

| | | |
|---|---|---|
| 2,535,099 | Slick | Dec. 26, 1950 |
| 2,663,952 | Winget | Dec. 29, 1953 |
| 2,689,661 | Przybylski | Sept. 21, 1954 |